United States Patent [19]

Kawaguchi

[11] Patent Number: 5,206,298
[45] Date of Patent: Apr. 27, 1993

[54] GRAFT COPOLYMER, SOLUTION CONTAINING THE GRAFT COPOLYMER FOR TREATING CONTACT LENS, AND METHOD OF TREATING CONTACT LENS WITH THE SOLUTION AND MAKING HYDROPHILIC LENS SURFACE

[75] Inventor: Toru Kawaguchi, Gifu, Japan

[73] Assignee: Tomei Sangyo Kabushiki Kaisha, Japan

[21] Appl. No.: 627,333

[22] Filed: Dec. 14, 1990

[30] Foreign Application Priority Data

Dec. 19, 1989 [JP] Japan .................. 1-329113

[51] Int. Cl.$^5$ .................. C08F 271/02; G02C 7/04
[52] U.S. Cl. .................. 525/283; 525/242; 525/260; 525/263; 525/276; 525/288; 525/303; 525/308; 525/309; 525/937; 523/108; 351/160 H; 252/351
[58] Field of Search .............. 525/283, 303, 308, 309, 525/242, 260, 263, 288, 276, 937

[56] References Cited

U.S. PATENT DOCUMENTS

| | | | |
|---|---|---|---|
| 4,205,144 | 5/1980 | Naarmann et al. | 525/290 |
| 4,753,990 | 6/1988 | Moriya et al. | 525/94 |
| 4,791,175 | 12/1988 | Janssen | 525/287 |
| 5,082,912 | 1/1992 | Kawaguchi | 525/276 |

FOREIGN PATENT DOCUMENTS

| | | |
|---|---|---|
| 0253515 | 1/1988 | European Pat. Off. |
| 3524370 | 1/1986 | Fed. Rep. of Germany. |
| 48-37910 | 11/1973 | Japan . |
| 63-246718 | 10/1988 | Japan . |

*Primary Examiner*—James J. Seidleck
*Assistant Examiner*—Vasu S. Jagannathan
*Attorney, Agent, or Firm*—Parkhurst, Wendel & Rossi

[57] ABSTRACT

A graft copolymer produced by polymerizing 2-hydroxyethyl methacrylate, or monomer mixture containing the monomer, by using initiator produced by copolymerizing (A) N-vinyllactam or styrene and (B) peroxy-fumarate or combination of the peroxy-fumarate and diester of fumaric acid, the peroxy-fumarate being represented by the formula (I):

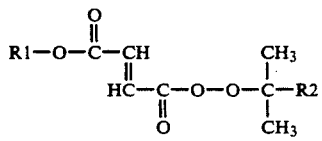

wherein R1 is a linear alkyl, branched alkyl or cycloalkyl group containing not more than 18 carbon atoms, or an aromatic hydrocarbon group containing 6 to carbon atoms; and R2 is a linear alkyl, branched alkyl or cycloalkyl group containing not more than 13 carbon atoms, or a phenyl group.

A solution for treating a contact lens, including the above graft copolymer and a solvent dissolving the copolymer. A method of treating a contact lens, comprising the step of wetting a surface of the contact lens with the above solution, and the step of contacting the wetted surface with a poor solvent, thereby modifying the hydrophobic contact lens surface into a hydrophilic surface.

3 Claims, 3 Drawing Sheets

GRAFT COPOLYMER, SOLUTION CONTAINING THE GRAFT COPOLYMER FOR TREATING CONTACT LENS, AND METHOD OF TREATING CONTACT LENS WITH THE SOLUTION AND MAKING HYDROPHILIC LENS SURFACE

BACKGROUND OF THE INVENTION

1. Field Of The Invention

The present invention generally relates to a graft copolymer, a solution containing the graft copolymer for treating a contact lens, and a method of treating a contact lens with the solution and making a hydrophilic lens surface. In particular, the present invention relates to a novel graft copolymer suitable for modifying a hydrophobic surface into a hydrophilic surface, technique of modifying into a hydrophilic surface a hydrophobic surface of a non-water absorbable or swellable contact lens such as a hard contact lens and a non-water swellable soft contact lens, and a contact lens treatment solution containing the graft copolymer which solution is suitably used for the technique.

2. Related Art Statement

There have conventionally been used a non-water absorbable or swellable contact lenses, such as a hard contact lens made mainly from methyl methacrylate, a high-degree oxygen permeable hard contact lens made mainly from siloxanylalkyl methacrylate, fluoroalkyl methacrylate, etc., and a non-water swellable soft contact lens formed of silicone rubber made mainly from polydimethylsiloxane or butyl rubber made mainly from butyl acrylate.

The surface of non-water swellable contact lens is hydrophobic. In particular, the degree of hydrophobicity of the high-degree oxygen permeable contact lens, which has recently come to public notice, is extremely high. For improving permeation of oxygen through a contact lens, there is the tendency of forming the lens by using a material containing an increased amount of silicone or fluorine. Accordingly, a contact lens capable of higher degree oxygen permeation contains a greater amount of silicone or fluorine. For this reason, the surface of high-degree oxygen permeable contact lens has high degree of hydrophobicity. Because of the high degree of hydrophobicity, lipid particles contained in tears easily cling to the lens surface, thereby fouling the surface and causing the lens to be bloomed. Consequently, the user or wearer loses a clear sight.

For modifying the hydrophobic lens surface into a hydrophilic surface, the contact lens may be subjected to the plasma surface treatment, or the chemical treatment using an acid, an alkali, etc. However, those methods suffer from low durability of the hydrophilic surface produced. In addition, it is time-consuming and troublesome to carry out each method on the contact lens later.

Further, there is known the wetting solution method in which a contact lens is immersed in a solution containing a hydrophilic polymer so that the polymer entities adhere to the lens surface and thereby modify the hydrophobic lens surface into a hydrophilic surface. This method permits, if necessary, repetitive treatment of the contact lens, and the hydrophilic lens surface is easily maintained.

An example of the wetting solution method is disclosed in Japanese Patent Application laid open for opposition purpose under Publication No. 48-37910 (1973). The disclosed method utilizes a contact lens treatment solution containing a water soluble polymer such as polyvinyl alcohol, hydroxyethyl cellulose, and poly vinylpyrrolidone. The treatment solution is effective for a contact lens with low degree of hydrophobicity, such as a hard contact lens made from methyl methacrylate and a high-degree oxygen permeable hard contact lens made mainly from methyl methacrylate. However, the solution is not effective for treating a contact lens with high degree of hydrophobicity, such as non-water swellable contact lens made from material containing a large amount of silicone or fluorine, because the polymer entities dissolved in the solution do not sufficiently adhere to the lens surface due to the high hydrophobicity thereof.

In addition, Japanese Patent Application laid open under Publication No. 63-246718 (1988) discloses a contact lens treatment solution containing a polymer with ionic electric charge. For using the treatment solution, however, it is needed that the contact lens surface to be treated therewith have electric charge whose sign is opposite to that of the polymer contained in the solution, and that the density of the opposite electric charge is higher than a certain level. Accordingly, an additional step of increasing the electric charge density on the lens surface is required before the step of solution treatment. This treatment method is therefore time-consuming and complex. As can be read from the detailed description of the patent document, the method needs a relatively long time, e.g., five minutes. Further, the disclosed solution is not satisfactory with respect to the capability of modifying a hydrophobic lens surface into a hydrophilic surface. Thus, the disclosed solution suffers from some disadvantages.

SUMMARY OF THE INVENTION

It is therefore an object of the present invention to provide a graft copolymer suitable for treating a contact lens and making the lens hydrophilic, a solution containing the graft copolymer, and a method of treating a contact lens with the solution. The treatment is very simple and safe, and is carried out in a short time. The treatment results in reducing the amount of lipid particles clinging to, or fouling, the contact lens, thereby assuring that the user can comfortably wear the lens for a long time. A high-degree oxygen permeable, non-water swellable contact lens is advantageously treated with the solution containing the graft copolymer.

The Inventor has researched and studied for achieving the above indicated object, and found that a graft copolymer produced by polymerizing 2-hydroxyethyl methacrylate, or a mixture of monomers which contains as a major constituent thereof 2-hydroxyethyl methacrylate, by using a specific polymer-type polymerization initiator containing a hydrophobic group in the molecule thereof, has excellent surface active property and advantageously adheres to a hydrophobic surface of a contact lens. That is, the graft copolymer has excellent capability of modifying a hydrophobic lens surface into a hydrophilic surface. In addition, the Inventor has found that a hydrophobic surface of a contact lens is easily modified into a hydrophilic surface by immersing the lens in a solution dissolving the graft copolymer, which is insoluble to water, immediately removing the lens from the solution, and rinsing the lens with a mass of poor solvent, such as tap water, which can dissolve substantially no amount of the graft copolymer. The present invention has been achieved based on these findings.

According to a first aspect of the present invention, there is provided a graft copolymer produced by polymerizing 2-hydroxyethyl methacrylate, or a mixture of monomers which contains as a major constituent thereof 2-hydroxyethyl methacrylate, by using a polymer-type polymerization initiator produced by copolymerizing (A) 40 to 60 mole % of an N-vinyllactam and (B) 60 to 40 mole % of at least one fumarate containing peroxy group (hereinafter, abbreviated to peroxy-fumarate), the peroxy-fumarate being represented by the formula (I):

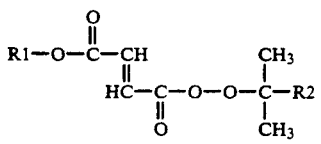

(I)

wherein R1 is a linear alkyl, branched alkyl or cycloalkyl group containing not more than 18 carbon atoms, or an aromatic hydrocarbon group containing 6 to 18 carbon atoms; and R2 is a linear alkyl, branched alkyl or cycloalkyl group containing not more than 13 carbon atoms, or a phenyl group.

According to a second aspect of the present invention, there is provided a graft copolymer produced by polymerizing 2-hydroxyethyl methacrylate, or a mixture of monomers which contains as a major constituent thereof 2-hydroxyethyl methacrylate, by using a polymer-type polymerization initiator produced by copolymerizing (A) 40 to 60 mole % of an N-vinyllactam and (B) 60 to 40 mole % of a combination of (b1) at least one peroxy-fumarate represented by the above indicated formula (I), and (b2) at least one diester of fumaric acid selected from the group consisting of alkyl fluoroalkyl fumarate, alkyl silicon-containing-alkyl fumarate, fluoroalkyl silicon-containing-alkyl fumarate, bis(fluoroalkyl) fumarate, and bis(silicon-containing-alkyl) fumarate, a mole ratio of the peroxy-fumarate to the diester of fumaric acid falling within a range of 9 to 1 to 1 to 9.

According to a third aspect of the present invention, there is provided a graft copolymer produced by polymerizing 2-hydroxyethyl methacrylate, or a mixture of monomers which contains as a major constituent thereof 2-hydroxyethyl methacrylate, by using a polymer-type polymerization initiator produced by copolymerizing (A) 40 to 90 mole % of styrene and (B) 60 to 10 mole % of at least one peroxy-fumarate represented by the formula (I).

According to a fourth aspect of the present invention, there is provided a solution for treating a contact lens, including at least one copolymer selected from the group consisting of the graft copolymers in accordance with the first, second and third aspects of the present invention, and a solvent dissolving the at least one copolymer. The solvent may be an ethylene glycol-type compound represented by the following formula (II):

(II)

wherein R3 is a hydrogen or a methyl group; and n is an integer of 1 to 20. Alternatively, the solvent may consist of not less than 20 weight % of an ethylene glycol-type compound represented by the formula (II), and not more than 80 weight % of water.

According to a fifth aspect of the present invention, there is provided a method of treating a contact lens, comprising the steps of wetting a surface of the contact lens with the solution in accordance with the fourth aspect of the present invention, and contacting the wetted surface of the contact lens with a poor solvent for the at least one copolymer contained in the solution, thereby modifying the surface of the contact lens into a hydrophilic surface.

Each of the first, second and third graft copolymers in accordance with the present invention contains a hydrophobic group in the main-chain polymer thereof, and simultaneously, the branch polymers of each graft copolymer is made either solely from 2-hydroxyethyl methacrylate (hereinafter, abbreviated to 2-HEMA) which is a hydrophilic monomer, or mainly from 2-HEMA. Therefore, each of the first, second and third graft copolymers serves as an excellent surface active polymer.

The contact lens treatment solution in accordance with the present invention contains at least one of the first, second and third graft copolymers. Since the graft copolymers are insoluble to water, the copolymer entities contained in the treatment solution are condensed with each other if the solution is diluted with water that is a poor solvent for the graft copolymers. When the entire surface of a contact lens is wetted with the treatment solution, for example in a manner that the lens is immersed in the solution, the copolymer entities contained in the solution cling, because of the hydrophobic groups thereof, to the hydrophobic lens surface. That is, the treatment solution of the present invention advantageously wets the hydrophobic lens surface because of its surface active function. If the contact lens immediately is rinsed with a poor solvent, such as water, which can dissolve substantially no amount of the graft copolymers, the copolymer entities on the lens surface condense due to their insolubility to water and strongly adhere to the lens surface, so that the lens surface obtains hydrophilic property.

In the present invention, a hydrophobic surface of a contact lens is easily modified into a hydrophilic surface, by immersing the lens in a solution containing at least one of the first, second and third graft copolymers, and immediately removing the lens from the solution and rinsing the lens with water, for example. Even in the case of a high-degree oxygen permeable, non-water swellable contact lens which is highly hydrophobic, the hydrophobic lens surface is advantageously modified into a hydrophilic surface by treating the lens with the solution, before the lens is worn by a user. The hydrophilic lens surface is effectively protected against the fouling due to lipid particles clinging to the surface. Thus, the user can comfortably wear the contact lens without feeling "unusual" matter on the lens surface, even if he or she continues to wear the lens for a long time.

In addition, the adhesion property of the graft copolymers with respect to the lens surface may be improved by producing each graft copolymer in a manner that branch polymers are attached to a main-chain polymer by polymerizing a mixture of 2-HEMA and a monomer selected from a predetermined group of monomers.

Furthermore, in the present invention, the solvent dissolving the graft copolymer or copolymers may consist solely of the ethylene glycol-type compound represented by the previously indicated formula (II), or consist of not less than 20 weight % of the ethylene glycol-type compound of the formula (II), and not more than 80 weight % of water. These solvents do not adversely affect the quality of a contact lens treated with the solution, while the solvents advantageously dissolve the graft copolymer or copolymers.

DETAILED DESCRIPTION OF THE INVENTION

Figure 1:
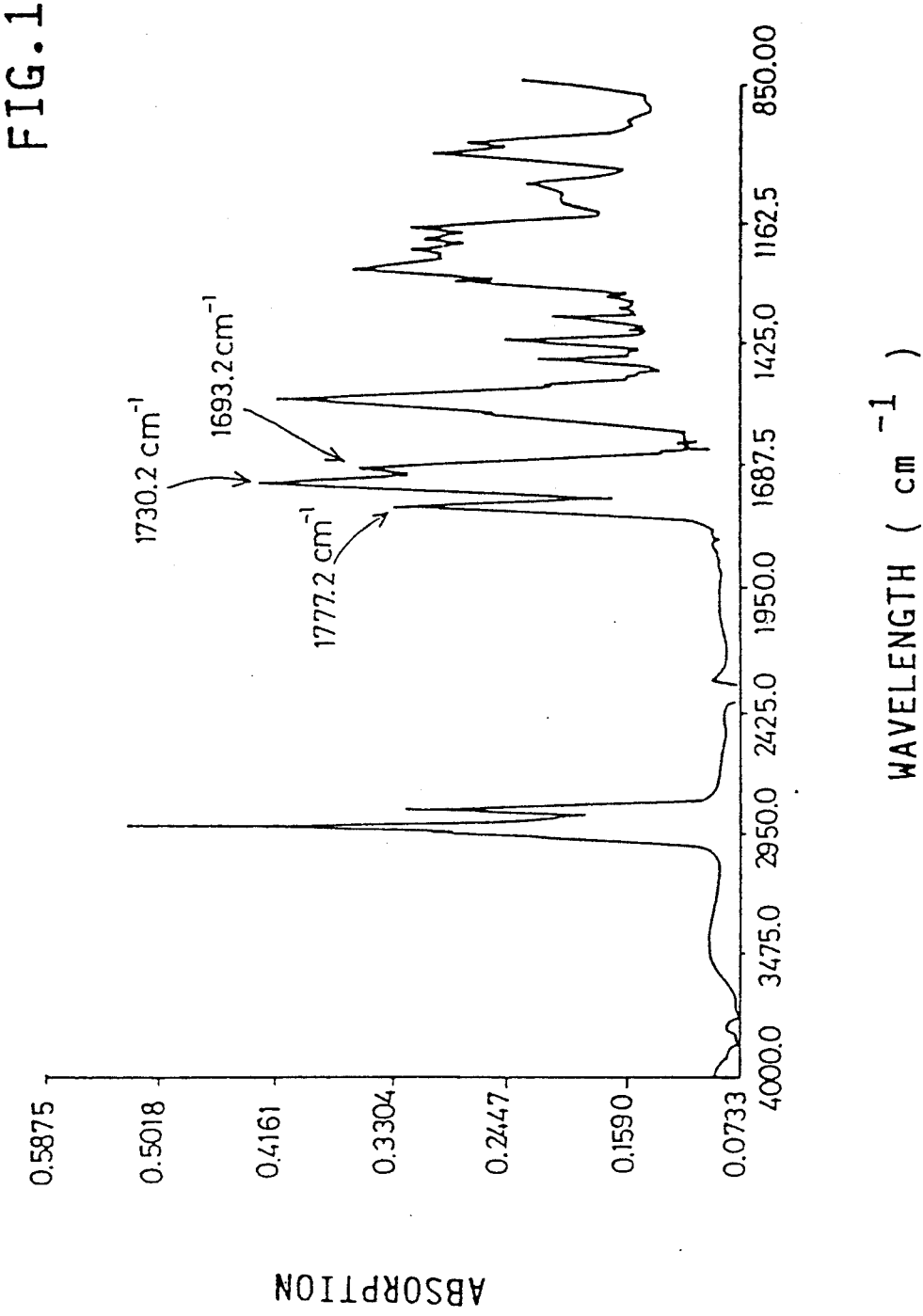
FIG. 1 is a graph showing a Fourier-transform infrared absorption spectrum (IR) of the polymer-type polymerization initiator of Preparation 1, which is used in the present invention.

The above and optional objects, features and advantages of the present invention will be better understood by reading the following detailed description of the invention.

For producing the first or second graft copolymer in accordance with the present invention, first, an N-vinyllactam is used for producing the N-vinyllactam-type, binary or ternary polymer-type polymerization initiator as a component or material for producing the first or second graft copolymer. The following N-vinyllactams are preferably used in the present invention: N-vinyl-2-pyrrolidone, N-vinyl-3-methyl-2-pyrrolidone, N-vinyl-5-methyl-2-pyrrolidone, N-vinyl-3, 3, 5-trimethyl-2-pyrrolidone, N-vinyl-5-phenyl-2-pyrrolidone, N-vinyl-3-benzyl-2-pyrrolidone, N-vinylpiperidone, N-vinylcapro-lactam, and N-vinylcapryllactam. Each of the N-vinyllactams may be used either alone or in combination with one or more of the other N-vinyllactams. Above all, the N-vinyl-2-pyrrolidone is the most recommendable since the compound is a common monomer and is easily available.

In addition, the peroxy-fumarate represented by the previously indicated formula (I) is used for copolymerization with the N-vinyllactam, for producing the N-vinyllactam-type polymer-type polymerization initiators. The peroxy-fumarate contains a peroxy group, —O—O—, in the molecule thereof. The following peroxy-fumarates are preferably used in the present invention: t-butylperoxy methyl fumarate, t-butylperoxy ethyl fumarate, t-butylperoxy isopropyl fumarate, t-butylperoxy n-butyl fumarate, t-butylperoxy n-pentyl fumarate, t-butylperoxy n-hexyl fumarate, t-butylperoxy n-octyl fumarate, t-butylperoxy 2-ethylhexyl fumarate, t-butylperoxy lauryl fumarate, t-butylperoxy stearyl fumarate, t-butylperoxy phenyl fumarate, t-butyl-peroxy cyclohexyl fumarate, t-pentylperoxy methyl fumarate, t-pentylperoxy ethyl fumarate, t-pentylperoxy isopropyl fumarate, t-pentylperoxy n-butyl fumarate, t-pentylperoxy n-pentyl fumarate, t-pentylperoxy n-hexyl fumarate, t-pentylperoxy n-octyl fumarate, t-pentylperoxy 2-ethylhexyl fumarate, t-pentylperoxy lauryl fumarate, t-pentylperoxy stearyl fumarate, t-pentylperoxy phenyl fumarate, t-hexylperoxy methyl fumarate, t-hexylperoxy ethyl fumarate, t-hexylperoxy isopropyl fumarate, t-hexylperoxy n-butyl fumarate, t-hexylperoxy n-pentyl fumarate, t-hexylperoxy n-hexyl fumarate, t-hexylperoxy n-octyl fumarate, t-hexylperoxy 2-ethylhexyl fumarate, t-hexylperoxy lauryl fumarate, t-hexylperoxy stearyl fumarate, t-hexylperoxy phenyl fumarate, t-cumylperoxy methyl fumarate, t-cumylperoxy ethyl fumarate, t-cumylperoxy isopropyl fumarate, t-cumylperoxy n-butyl fumarate, t-cumylperoxy n-pentyl fumarate, t-cumylperoxy n-hexyl fumarate, t-cumylperoxy n-octyl fumarate, t-cumylperoxy 2-ethylhexyl fumarate, t-cumylperoxy lauryl fumarate, t-cumylperoxy stearyl fumarate, and t-cumylperoxy phenyl fumarate. Each of the peroxy-fumarates may be used either alone or in combination with one or more of the other peroxy-fumarates.

The N-vinyllactam-type, binary polymer-type polymerization initiator as the material of the first graft copolymer in accordance with the present invention, is produced by copolymerizing the above indicated two components or monomers, namely, N-vinyllactam and peroxy-fumarate, in the form of a mixture thereof.

In addition, in the present invention, the ternary polymer-type polymerization initiator produced by copolymerizing the above indicated two monomers, namely, N-vinyllactam and peroxy-fumarate, together with a diester of fumaric acid selected from the group consisting of (i) alkyl fluoroalkyl fumarate, (ii) alkyl silicon-containing-alkyl fumarate, (iii) fluoroalkyl silicon-containing-alkyl fumarate, (iv) bis(fluoroalkyl) fumarate, and (v) bis-(silicon-containing-alkyl) fumarate, is used as the material of the second graft copolymer of the invention. Each of the diesters (i) through (v) may be used either alone or in combination with one or more of the other diesters.

The alkyl fluoroalkyl fumarate (i) represented by the following formula (III) is preferably used in the present invention:

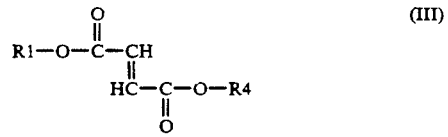

wherein R1 is the same as previously indicated; and R4 is —(CH$_2$)$_k$—C$_a$H$_b$F$_{2a+1-b}$ wherein is an integer of 1 to 21, b is 0 or 1, and k is an integer of 0 to 3.

Examples of the alkyl fluoroalkyl fumarate (III) are as follows: methyl trifluoroethyl fumarate, ethyl trifluoroethyl fumarate, isopropyl trifluoroethyl fumarate, octyl trifluoroethyl fumarate, phenyl trifluoroethyl fumarate, methyl hexafluoroisopropyl fumarate, ethyl hexafluoroisopropyl fumarate, isopropyl hexafluoroisopropyl fumarate, octyl hexafluoroisopropyl fumarate, cyclohexyl hexafluoroisopropyl fumarate, phenyl hexafluoroisopropyl fumarate, methyl octafluoropentyl fumarate, ethyl octafluoropentyl fumarate, isopropyl octafluoropentyl fumarate, octyl octafluoropentyl fumarate, cyclohexyl octafluoropentyl fumarate, and phenyl octafluoropentyl fumarate.

The alkyl silicon-containing-alkyl fumarate (ii) represented by the following formula (IV) is preferably used in the present invention:

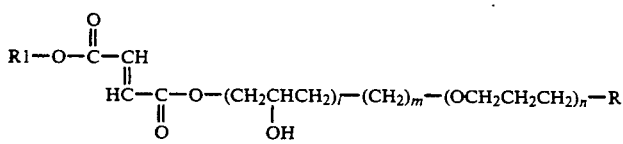

(IV)

wherein R1 is the same as previously indicated; R5 is

wherein each of A1, A2 and A3 is selected from —CH₃ and —O—Si(CH₃)₃; l is 0 or 1; m is an integer of 1 to 3; and n is 0 or 1 (l is 0 in the particular case where n is 1).

Examples of the alkyl silicon-containing-alkyl fumarate (IV) are as follows: methyl trimethylsilyl-propyl fumarate, ethyl trimethylsilyl-propyl fumarate, isopropyl trimethyl-silyl-propyl fumarate, octyl trimethylsilyl-propyl fumarate, cyclohexyl trimethylsilyl-propyl fumarate, phenyl trimethyl-silyl-propyl fumarate, methyl pentamethyldisiloxanyl-propyl fumarate, ethyl pentamethyldisiloxanyl-propyl fumarate, isopropyl pentamethyldisiloxanyl-propyl fumarate, octylpentamethyldisiloxanyl-propyl fumarate, cyclohexyl pentamethyldisiloxanyl-propyl fumarate, phenyl pentamethyl-di-siloxanyl-propyl fumarate, methyl methyl-bis(-trimethylsilyl-oxy)silyl-propyl fumarate, ethyl methyl-bis(trimethylsilyl-oxy)silyl-propyl fumarate, isopropyl methyl-bis(trimethyl-silyloxy)silyl-propyl fumarate, octyl methyl-bis(trimethyl-silyloxy)silyl-propyl fumarate, cyclohexyl methyl-bis(tri-methylsilyloxy)silyl-propyl fumarate, phenyl methyl-bis(tri-methylsilyloxy)silyl-propyl fumarate, methyl tris(trimethyl-silyloxy)silyl-propyl fumarate, ethyl tris(trimethylsilyl-oxy)silyl-propyl fumarate, isopropyl tris(trimethylsilyl-oxy)silyl-propyl fumarate, octyl tris(trimethylsilyloxy)-silyl-propyl fumarate, cyclohexyl tris(trimethylsilyloxy)-silyl-propyl fumarate, phenyl tris(trimethylsilyloxy)silyl-propyl fumarate, methyl pentamethyldisiloxanyl-propyloxy-ethyl fumarate, ethyl pentamethyldisiloxanyl-propyloxyethyl fumarate, isopropyl pentamethyl-disiloxanyl-propyloxyethyl fumarate, octyl pentamethyldisiloxanyl-propyloxyethyl fumarate, cyclohexyl pentamethyldisiloxanyl-propyloxyethyl fumarate, and phenyl pentamethyldisiloxanyl-propyloxyethyl fumarate.

The fluoroalkyl silicon-containing-alkyl fumarate (iii) represented by the following formula (V) is preferably used in the present invention:

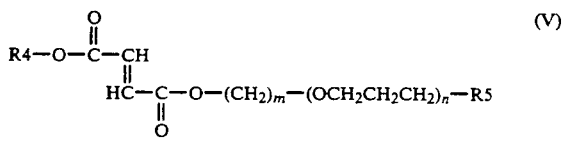

(V)

wherein R4, R5, , and are the same as previously indicated.

Examples of the fluoroalkyl silicon-containing-alkyl fumarate (V) are as follows: trifluoroethyl trimethylsilylpropyl fumarate, hexafluoroisopropyl trimethylsilyl-propyl fumarate, octafluoropentyl trimethylsilyl-propyl fumarate, trifluoroethyl pantamethyldisiloxanyl-propyl fumarate, hexa-fluoroisopropyl pentamethyl-disiloxanyl-propyl fumarate, octafluoropentyl pentamethyldisiloxanyl-propyl fumarate, trifluoroethyl methyl-bis(trimethylsilyloxy)silyl-propylfumarate, hexafluoroisopropyl methyl-bis(trimethylsilyloxy)-silyl-propyl fumarate, octafluoropentyl methyl-bis(tri-methylsilyloxy)silyl-propyl fumarate, trifluoroethyl tris-(trimethylsilyloxy)silyl-propyl fumarate, hexafluoro-isopropyl tris(trimethylsilyloxy)silyl-propyl fumarate, octafluoropentyl tris(trimethylsilyloxy)silyl-propyl fumarate, trifluoroethyl pentamethyldisiloxanyl-propyloxyethyl fumarate, hexafluoroisopropyl pentamethyldisiloxanyl-propyloxyethyl fumarate, and octafluoropentyl pentamethyldi-siloxanyl-propyloxyethyl fumarate.

The bis(fluoroalkyl) fumarate (iv) represented by the following formula (VI) is preferably used in the present invention:

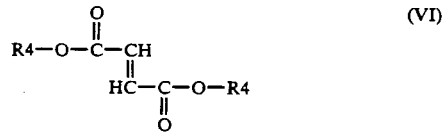

(VI)

wherein R4 is the same as previously indicated.

Examples of the bis(fluoroalkyl) fumarate (VI) are as follows: bis(trifluoroethyl) fumarate, bis(tetrafluoropropyl) fumarate, bis(hexafluoroisopropyl) fumarate, and bis(octafluoropentyl) fumarate.

The bis(silicon-containing alkyl) fumarate (v) represented by the following formula (VII) is preferably used in the present invention:

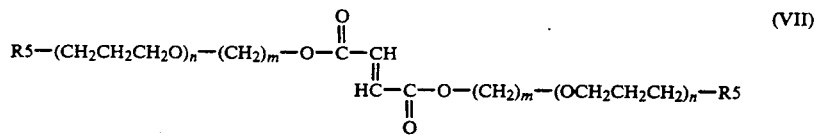

(VII)

wherein R5, m, and n is the same as previously indicated.

Examples of the bis(silicon-containing alkyl) fumarate (VII) are as follows: bis(trimethylsilylpropyl) fumarate, bis-(pentamethyldisiloxanyl-propyl) fumarate, bis(-pentamethyldi-siloxanyl-propyloxyethyl) fumarate, bis(methylbis(trimethyl-silyloxy)silyl-propyl) fumarate, and bis(tris(trimethyl-silyloxy)silylpropyl) fumarate.

For producing the N-vinyllactam-type, binary polymer-type polymerization initiator as the material of the first graft copolymer in accordance with the present invention, 40 to 60 mole % of the N-vinyllactam and 60 to 40 mole % of the peroxy-fumarate represented by the formula (I) are copolymerized. The peroxy-fumarate has properties that it is rather difficult to polymerize the monomer alone but that the monomer is advantageously copolymerizable with the N-vinyllactam. In particular, it is noted that the copolymer made by copolymerizing the two monomers, namely, peroxy-fumarate and N-vinyllactam, has high degree of alternation of the two monomers in the molecule. However, if the proportion of the N-vinyllactam is below the lower limit, 40 mole %, namely, if the proportion of the peroxy-fumarate exceeds the upper limit, 60 mole %, an excessive amount of peroxy-fumarate remains without copolymerizing with N-vinyllactam. This is not economical. On the other hand, if the proportion of the N-vinyllactam exceeds the upper limit, 60 mole %, namely, if the proportion of the peroxy-fumarate is below the lower limit, 40 mole %, the copolymerization tends to produce a mixture of the binary copolymer of N-vinyllactam and peroxy-fumarate, and homopolymer of the N-vinyllactam. In this case, it is difficult to separate and/or purify the copolymer of N-vinyllactam and peroxy-fumarate, namely, binary polymer-type polymerization initiator in accordance with the present invention, from the homopolymer of N-vinyllactam. For these reasons, it is preferred that the proportion of N-vinyllactam to that of peroxy-fumarate fall within the range of from 40 mole % to 60 mole %, to 60 mole % to 40 mole %. It is the most recommendable that 50 mole % of N-vinyllactam be reacted with 50 mole % of peroxy-fumarate.

In the case where the first graft copolymer produced by using the N-vinyllactam-type, binary polymer-type polymerization initiator, is used for preparing a solution for treating a contact lens which solution contains the first graft copolymer, it is recommended to introduce a highly hydrophobic substitutional group into a main-chain polymer of the graft copolymer, so that the graft copolymer entities strongly adhere to the contact lens surface. Therefore, it is preferred that the substitutional group, R1, of the peroxy-fumarate (I) used for producing the binary polymer-type polymerization initiator be a linear alkyl, branched alkyl or cycloalkyl group containing 8 to 18 carbon atoms or an aromatic hydrocarbon group containing 6 to 18 carbon atoms.

In addition, for producing the N-vinyllactam-type, ternary polymer-type polymerization initiator as the material of the second graft copolymer in accordance with the present invention, 40 to 60 mole % of the N-vinyllactam is copolymerized with 60 to 40 mole % of a combination of the peroxy-fumarate represented by the formula (I) and the previously indicated diester of fumaric acid represented by the formula (III) to (VII), the mole ratio of the peroxy-fumarate to the diester of fumaric acid falling within the range of 9 to 1 to 1 to 9. Each of the diesters of fumaric acid of the formulae (III) through (VII) has properties similar to those of the peroxy-fumarate (I), namely, that it is rather difficult to polymerize the monomer alone but that the monomer is advantageously copolymerizable with the N-vinyllactam. Similarly, it is noted that the copolymer made by copolymerizing the three monomers has high degree of alternation of N-vinyllactam and peroxy-fumarate or diester of fumaric acid. However, if the proportion of the N-vinyllactam is below the lower limit, 40 mole %, namely, if the proportion of the peroxy-fumarate and diester of fumaric acid exceeds the upper limit, 60 mole %, an excessive amount of peroxy-fumarate and/or diester of fumaric acid remains without copolymerizing with N-vinyllactam. This is not economical. On the other hand, if the proportion of the N-vinyllactam exceeds the upper limit, 60 mole %, namely, if the proportion of the peroxy-fumarate and diester of fumaric acid is below the lower limit, 40 mole %, the copolymerization tends to produce a mixture of the ternary polymer of N-vinyllactam, peroxy-fumarate and diester of fumaric acid, and homopolymer of the N-vinyllactam. In this case, it is difficult to separate and/or purify the polymer of N-vinyllactam, peroxy-fumarate, and diester of fumaric acid, namely, ternary polymer-type polymerization initiator, from the homopolymer of N-vinyllactam. For these reasons, it is preferred that the proportion of N-vinyllactam to that of peroxy-fumarate and diester of fumaric acid fall within the range of from 40 mole % to 60 mole %, to 60 mole % to 40 mole %. It is the most recommendable that 50 mole % of N-vinyllactam be reacted with 50 mole % of peroxy-fumarate and diester of fumaric acid.

The ternary polymer-type polymerization initiator contains as a copolymerized component thereof the diester of fumaric acid (III) to (VII) which is a hydrophobic monomer, for the following reasons: As previously described, in the case where the first graft copolymer produced by using the binary polymer-type polymerization initiator, is used for preparing a contact lens treatment solution, it is preferred to introduce a highly hydrophobic substitutional group into a main-chain polymer of the graft copolymer, so as to improve the capability thereof of modifying the hydrophobic contact lens surface into a hydrophilic surface. Therefore, it is recommended that the substitutional group, R1, of the peroxy-fumarate (I) used for producing the polymer-type polymerization initiator as the material of the graft copolymer have the greatest possible number of carbon atoms. However, as the number of carbon atoms of the group R1 of the peroxy-fumarate (I) is increased, the glass transition temperature of the binary polymer-type polymerization initiator is lowered and accordingly the viscosity thereof is increased, so that the handling thereof becomes troublesome. The ternary polymer-type polymerization initiator is free from this problem. In particular, it is noted that it is possible to produce a ternary polymer-type polymerization initiator in the form of powder, by using a peroxy-fumarate whose group, R1, is a linear alkyl, branched alkyl or cycloalkyl group containing 1 to 6 carbon atoms, or a phenyl group, together with the diester of fumaric acid (III) to (VII). In this case, too, a highly hydrophobic group is introduced into a main-chain polymer of the polymerization initiator. The second graft copolymer is easily produced by using the ternary polymer-type polymerization initiator, and the second graft copolymer acts as an excellent surface active polymer.

For the above reasons, the diester of fumaric acid (III) to (VII) is used together with the peroxy-fumarate (I) for producing the ternary polymer-type polymerization initiator. If the proportion of the peroxy-fumarate to that of the diester of fumaric acid is below the lower limit, 1 to 9 in mole ratio, the ternary polymer-type polymerization initiator produced tends to provide a graft copolymer which suffers from low degree of grafting. On the other hand, if the proportion of the peroxy-fumarate to that of the diester of fumaric acid exceeds the upper limit, 9 to 1 in mole ratio, then the proportion of the diester of fumaric acid is too low to give significant hydrophobic property to the ternary polymer-type polymerization initiator produced. The units of diester of fumaric acid in the molecule function as hydrophobic sites of the ternary polymer-type polymerization initiator. Therefore, it is required that the mole ratio of the peroxy-fumarate to the diester of fumaric acid falls within the range of from 9 to 1, to 1 to 9.

The third graft copolymer in accordance with the present invention is produced by using the polymer-type polymerization initiator obtained by copolymerizing 40 to 90 mole % of styrene and 60 to 10 mole % of the peroxy-fumarate represented by the formula (I).

Regarding the third graft copolymer, the peroxy-fumarate (I) has properties that it is rather difficult to polymerize the monomer alone but that the monomer is advantageously copolymerizable with styrene. However, if the proportion of styrene is below the lower limit, 40 mole %, that is, if the proportion of peroxy-fumarate exceeds the upper limit, 60 mole %, an excessive amount of peroxy-fumarate remains without copolymerizing with styrene. This is not economical. On the other hand, if the proportion of the styrene exceeds the upper limit, 90 mole %, namely, if the proportion of the peroxy-fumarate is below the lower limit, 10 mole %, the polymer-type polymerization initiator produced contains too many styrene units in the molecule and accordingly the hydrophobicity of the polymerization initiator becomes too high. Consequently, the graft copolymer produced by using this polymerization initiator is not dissolved uniformly even in a good solvent for a polymer made solely or mainly from 2-hydroxyethyl methacrylate. It is therefore preferred that the proportion of the styrene to that of the peroxy-fumarate fall within the range of from 40 mole % to 60 mole %, to 90 mole % to 10 mole %.

In addition, regarding the third graft copolymer, the styrene contained therein is a hydrophobic monomer. Accordingly, it is preferred that the group, R1, of the peroxy-fumarate (I) copolymerized with the styrene be a linear alkyl, branched alkyl or cycloalkyl group containing 1 to 6 carbon atoms, or a phenyl group. In the case where the number of carbon atoms of the group R1 of the peroxy-fumarate (I) is excessively large, the hydrophobicity of the polymer-type polymerization initiator produced becomes too high, which results in too low a solubility of the polymerization initiator in 2-hydroxyethyl methacrylate used as the monomer for producing the third graft copolymer, or a polymerization solvent containing the monomer.

The N-vinyllactam-type or styrene-type, polymer-type polymerization initiator used as the material for the first, second or third graft copolymer in accordance with the present invention, is easily produced by a conventional radical polymerization method using a common radical polymerization initiator, such as bulk polymerization, solution polymerization, suspension polymerization, and emulsion polymerization.

In addition, it is recommended that the temperature at which the N-vinyllactam-type or styrene-type, polymer-type polymerization initiator is produced, falls within the range of about 0 to about 60° C., at which the peroxy group contained in the peroxy-fumarate is prevented from decomposing. A radical polymerization initiator which may be used at this temperature range is preferably selected from (i) azo compounds such as 2, 2′-azobis(4-methoxy-2, 4-dimethylvaleronitrile), 2, 2′-azobis(2-cyclopropylpropionitrile), 2, 2′-azobis(2, 4-dimethylvaleronitrile), and 2, 2′-azobisisobutyronitrile; and (ii) organic peroxides such as isobutylperoxide, diisopropylperoxy dicarbonate, and t-butylperoxy pivalate. Each of the radical polymerization initiators may be used either alone or in combination with one or more of the other initiators.

Furthermore, it is preferred that about 0.01 to 5 parts by weight of the radical polymerization initiator be used for 100 parts by weight of all the monomers to be copolymerized. The polymerization time is determined depending upon the polymerization temperature and radical polymerization initiator employed. The time is preferably selected at about 1 to 72 hours.

Preferably, the polymer-type polymerization initiator is produced so that the number average molecular weight of the polymerization initiator falls within the range of about 1,000 to about 1,000,000, more advantageously within the range of about 1,000 to about 10,000. If the molecular weight of the polymer-type polymerization initiator is below the lower limit, namely, about 1,000, the polymerization initiator tends to provide a graft copolymer which does not have the properties of the main-chain polymer. On the other hand, if the molecular weight exceeds the upper limit, namely, about 1,000,000, the polymerization initiator tends to provide a graft copolymer which has an excessively high molecular weight and accordingly suffers from insufficient solubility to a solvent used for preparing a solution for treating a contact lens.

The N-vinyllactam-type, polymer-type polymerization initiator used in the present invention has the structural feature that the hydrophilic units of N-vinyllactam, and the hydrophobic site-containing units of peroxy-fumarate and optionally diester of fumaric acid, are alternately contained in the molecule. Therefore, the polymer-type polymerization initiator is easily dissolved in 2-hydroxyethyl methacrylate or a mixture of monomers which contains as a major constituent thereof the 2-hydroxyethyl methacrylate, or a polymerization solvent containing the 2-hydroxyethyl methacrylate or the monomers mixture. This enables uniform grafting of the monomer or monomers to the main-chain polymer. The graft copolymer thus produced serves as an excellent surface active agent because of the hydrophobic sites contained in the main-chain polymer.

In addition, the styrene-type, polymer-type polymerization initiator used in the present invention contains in the molecule thereof benzene rings that are hydrophobic and have excellent adhesion property. Therefore, the graft copolymer produced by using this copolymerization initiator functions as a good hydrophobic/hydrophilic interface active agent.

The first, second or third graft copolymer in accordance with the present invention is produced by polymerizing 2-hydroxyethyl methacrylate or a mixture of monomers which contains as a major constituent thereof the 2-hydroxyethyl methacrylate by using the N-vinyllactam-type or styrene-type polymer-type polymerization initiator, namely, grafting the former to the latter. The monomers mixture contains one or more monomers to be copolymerized with the 2-hydroxyethyl methacrylate for the graft copolymerization.

In the case where a mixture of 2-hydroxyethyl methacrylate and a monomer selected from (i) alkyl acrylate and alkyl methacrylate; (ii) siloxanylalkyl acrylate and siloxanylalkyl methacrylate; (iii) fluoroalkyl acrylate and fluoroalkyl methacrylate; (iv) styrene-type monomer, and (v) vinyl ester and its derivatives, is used for the graft copolymerization, the graft copolymer produced has excellent adhesion property with respect to a contact lens surface. The monomers mixture may be prepared by mixing with 2-hydroxyethyl methacrylate one or more monomers selected from the above indicated group. It is preferred that the proportion of the monomer or monomers mixed with the 2-hydroxyethyl methacrylate be not more than 20 weight % of the monomers mixture. If the proportion of the monomer or monomers mixed exceeds 20 weight % the hydrophobicity of the graft copolymer produced becomes excessively high, which lowers the capability of the solution containing the graft copolymer to modify the hydrophobic surface of a contact lens into a hydrophilic surface.

Examples of the alkyl acrylate and alkyl methacrylate (i) to be mixed with 2-hydroxyethyl methacrylate are as follows: methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, n-hexyl acrylate, n-hexyl methacrylate, 2-ethylhexyl acrylate, 2-ethylhexyl methacrylate, lauryl acrylate, lauryl methacrylate, phenyl acrylate, and phenyl methacrylate.

Examples of the siloxanylalkyl acrylate and siloxanylalkyl methacrylate (ii) to be mixed with the 2-hydroxyethyl methacrylate are as follows: trimethylsilyl-methyl acrylate, trimethylsilyl-methyl methacrylate, tri-methylsilyl-propyl acrylate, trimethylsilyl-propyl methacrylate, pentamethyldisiloxanyl-methyl acrylate, penta-methyldisiloxanyl-methyl methacrylate, pentamethyldi-siloxanyl-propyl acrylate, pentamethyldisiloxanyl-propyl methacrylate, methylbis[trimethylsiloxy]silyl-propyl acrylate, methylbis[trimethylsiloxy]silyl-propyl methacrylate, tris[trimethylsiloxy]silyl-propyl acrylate, tris[trimethylsiloxy]silyl-propyl methacrylate, methylbis-[trimethylsiloxy]silyl-propylglycerol acrylate, and methyl-bis[trimethylsiloxy]silyl-propylglycerol methacrylate.

Examples of the fluoroalkyl acrylate and fluoroalkyl methacrylate (iii) to be mixed with the 2-hydroxyethyl methacrylate are as follows: 2, 2, 2-trifluoroethyl acrylate, 2, 2, 2-trifluoroethyl methacrylate, 2, 2, 3, 3-tetrafluoropropyl acrylate, 2, 2, 3, 3-tetrafluoropropyl methacrylate, 1, 1, 1, 3, 3, 3-hexafluoro-2-propyl acrylate, 1, 1, 1, 3, 3, 3-hexafluoro-2-propyl methacrylate, 2, 2, 3, 3, 4, 4, 5, 5-octafluoropentyl acrylate, 2, 2, 3, 3, 4, 4, 5, 5-octafluoropentyl methacrylate, 2, 2, 3, 3, 4, 4, 5, 5, 6, 6, 7, 7-dodecafluoroheptyl acrylate, and 2, 2, 3, 3, 4, 4, 5, 5, 6, 6, 7, 7-dodecafluoroheptyl methacrylate.

Examples of the styrene-type monomer (iv) to be mixed with the 2-hydroxyethyl methacrylate are as follows: styrene, para-methylstyrene, tert-butylstyrene, pentafluorostyrene, trimethylsilylstyrene, and tris(-trimethylsiloxy)-silylstyrene.

Examples of the vinyl ester and its derivatives (v) to be mixed with the 2-hydroxyethyl methacrylate are as follows: vinyl acetate, vinyl caproate, vinyl caprylate, and vinyl laurate.

The graft copolymers in accordance with the present invention are easily polymerized by using appropriate combinations of the above indicated polymer-type polymerization initiators, and the 2-hydroxyethyl methacrylate or the monomers mixture containing as a major constituent thereof the 2-hydroxyethyl methacrylate. This polymerization may be effected by radical polymerization. As previously indicated, the radical polymerization includes various methods, such as bulk polymerization, solution polymerization, suspension polymerization, and emulsion polymerization. Since, in the present case, the 2-hydroxyethyl methacrylate entities contain in the molecules thereof hydroxyethyl groups that are easily subjected to chain transfer reaction due to radicals, the bulk polymerization method or the like is not suitable because crosslinking reaction occurs among the monomer entities and the crosslinked entities are insoluble in the solvent. Therefore, the solution polymerization method using a solvent which contains a chain transfer agent or a solvent which functions as a chain transfer agent, is preferably employed in the present invention.

In the case where a chain transfer agent is used, the following agents are preferably used in the present invention: mercaptan and its derivatives such as n-butylmercaptan, dodecylmercaptan, and thioglycollic acid; chloroform; carbon tetrachloride; and carbon tetrabromide. It is recommended that 0.05 to 5 parts by weight of the chain transfer agent be used for 100 parts by weight of the monomer or monomers to be polymerized.

For producing the graft copolymers in accordance with the present invention, 0.01 to 10 parts by weight of polymer-type polymerization initiator is preferably used with 100 parts by weight of the monomer or monomers to be polymerized. If the proportion of the polymerization initiator is below the lower limit, 0.01 parts by weight, the graft copolymer produced suffers from poor surface active property. On the other hand, if the proportion of the initiator exceeds the upper limit, 10 parts by weight, the graft copolymer produced suffers from poor hydrophilic property.

Next, the solvent used for the solution polymerization is preferably selected from alcohol and its derivatives such as methanol, ethanol, and ethylene glycol monomethyl ether; and dimethyl sulfoxide. It is recommended that 50 to 1,000 parts by weight of the solvent be used for 100 parts by weight of the monomer or monomers to be polymerized. If the proportion of the solvent used is below the lower limit, 50 parts by weight, crosslinking reaction tends to occur during the polymerization process so that the solvent may become gel. On the other hand, if the proportion of the solvent exceeds the upper limit, 1,000 parts by weight, an excessively large amount of precipitating solvent is needed for precipitating the graft copolymer produced, in the purification process after the polymerization process.

The polymerization for producing the graft copolymers is carried out at from room temperature to 120° C. for a time necessary for substantial completion of the reaction.

The polymer-type polymerization initiators used for producing the graft copolymers in accordance with the present invention, contain in the molecule thereof a number of peroxy groups that function as radicals, and the peroxy groups are not decomposed up to relatively high temperature. However, the rate of decomposition of the peroxy groups is low in the graft copolymerization using the 2-hydroxyethyl methacrylate or the monomers mixture containing as a major constituent theeof the 2-hydroxyethyl methacrylate. Therefore, even after the completion of grafting of the monomer or monomers, a certain number of peroxy groups remain without being reacted, which lowers the stability of the graft copolymer produced. More specifically described, the peroxy groups left in the graft copolymer produced are decomposed little by little even at room temperature as time elapses, and the thus produced radicals act on, for example, the 2-hydroxyethyl groups in the graft copolymer, so that crosslinking occurs among the copolymer entities. For avoiding this problem, it is required to use a substance such as tertiary amine that has the property of enhancing or accelerating the rate of decomposition of peroxy groups.

Examples of the tertiary amine preferably used are as follows: triethylamine, N, N-dimethyl aniline, and dimethylbenzylamine. It is recommended that the amount in mole of the tertiary amine used fall within the range of from the same as, to twice, that of the peroxy groups contained in the polymer-type polymerization initiator. If the amount of the tertiary amine is below the lower limit, namely, the amount equal in mole to that of the peroxy groups, a certain number of peroxy groups may be left without being reacted. On the other hand, if the amount of the tertiary amine exceeds the upper limit, namely, twice the amount in moles of the peroxy groups, the polymerization results in producing a heavily colored solution containing the graft copolymer produced. By the use of tertiary amine for the graft copolymerization, the graft copolymer produced has an improved degree of grafting and, additionally, all the peroxy groups are decomposed. The thus obtained graft copolymer has excellent stability.

After an appropriate combination of a polymer-type polymerization initiator and the monomer or mixture of monomers are polymerized under suitable conditions, the polymerization product is diluted with methanol, and subsequently is poured in a poor solvent such as acetone or diethyl ether so as to precipitate the product. The precipitated product is filtered, and dried under reduced pressure. Thus, the graft copolymer is obtained.

In the polymerization process for producing the graft copolymer in accordance with the present invention, a linear polymer which is not a graft copolymer is produced as a by-product because of free radicals, in addition to the graft copolymer. However, the graft copolymer can be separated and purified from the by-product by a suitable method.

For preparing the treatment solution in accordance with the present invention which solution is used for treating a contact lens, it is unnecessary to separate or purify the crude graft copolymer as produced, because the solution containing the crude graft copolymer is sufficiently capable of modifying a hydrophobic lens surface into a hydrophilic surface.

Regarding the number average molecular weight of the crude graft copolymer, it is desirable that the molecular weight fall within the range of about 1,000 to about 10,000,000, more advantageously from about 2,000 to 100,000. If the molecular weight of the crude graft copolymer is below the lower limit, about 1,000, the solubility of the graft copolymer to water becomes excessively high. More specifically described, when a solution containing the crude graft copolymer is used for treating a contact lens, the copolymer entities may just adhere to the lens surface. However, if the lens surface is rinsed with water, the copolymer entities are easily washed away from the lens surface. On the other hand, if the molecular weight of the crude graft copolymer exceeds the upper limit, about 10,000,000, the solubility of the graft copolymer to a solvent becomes excessively low.

Generally, a solvent used for preparing a solution for treating a contact lens is required not to change the quality of the contact lens such as base curve, power and size. Water has conventionally been used as a common solvent that does not adversely affect the quality of a contact lens. In the present invention, however, a solvent other than water is needed because the crude graft copolymer is insoluble in water. A solvent which does not change the quality of a contact lens and dissolves the crude graft copolymer, is employed in the present invention.

Specifically described, is preferably used a solvent consisting of 20 to 100 weight % of an ethylene glycol-type compound represented by the formula (II): HO—(CH$_2$CH$_2$O)n—R3 wherein R3 is a hydrogen or a methyl group; and n is an integer of 1 to 20, and 80 to 0 weight % of water. Therefore, the solvent may consist solely of the compound (II).

In the case where the number, n, is zero in the formula (II), the compound is water or methanol. However, water cannot dissolve the graft copolymer, and methanol may change the quality of a contact lens. On the other hand, if the number, n, exceeds the upper limit, 20, the molecular weight of the compound (II) becomes excessively high, so that the solvent containing the compound (II) becomes too viscous to utilize.

The solution in accordance with the present invention for treating a contact lens may be prepared by using as essential constituents thereof the above indicated solvent and the crude graft copolymer. It is recommended that the concentration of the pure graft copolymer in the solvent fall within the range of 0.01 to 1.5% by weight, more advantageously within the range of 0.1 to 1.0% by weight. If the concentration of the graft copolymer exceeds the upper limit, 1.5% by weight, the graft copolymer entities on the lens surface immediately condense and precipitate upon application thereto of water, so that the copolymer entities are deposited on the lens surface. On the other hand, if the concentration of the graft copolymer is below the lower limit, 0.01% by weight, the amount of the graft copolymer entities adhering to the lens surface is excessively reduced, and the solution suffers from low capability of making hydrophilic the hydrophobic lens surface.

The contact lens treatment solution prepared as described above may further contain, as needed, at least one of surface active agent, viscosity-increasing agent, agent for making a solution isotonic, and antiseptic. By addition of one or more of these substances, the treatment solution may also be useful as a detergent, preservative, or detergent/preservative solution, as well as the hydrophobic to hydrophilic surface modifying solution.

The contact lens treatment solution in accordance with the present invention may be used in such a manner that a contact lens is immersed in the solution or the solution is sprayed on, or applied to, the contact lens surface and subsequently the contact lens is rinsed with a mass of water. This easy treatment results in the strong adhesion of the hydrophilic copolymer entities containing as a major component thereof the 2-hydroxyethyl methacrylate, to the contact lens surface, thereby modifying the hydrophobic surface into a hydrophilic surface.

Since the hydrophilic graft copolymer is insoluble to water, the graft copolymer strongly adheres to the contact lens surface and thereby makes hydrophilic the hydrophobic lens surface. In addition, since the graft copolymer has the hydrophobic sites in the molecule, the graft copolymer advantageously adheres to the contact lens surface even if the hydrophobicity of the lens surface is considerably high. The hydrophilic lens surface is effectively prevented from fouling due to adhesion thereto of hydrophobic lipid particles. Thus, blooming of the contact lens is so reduced that the user can wear the lens for a much longer time.

Hereinafter, there will be described some examples of the graft copolymer and contact lens treatment solution in accordance with the present invention. Before entering the description of the invention examples, first, some examples of polymer-type polymerization initiators for producing the graft copolymers of the invention are described. It is however to be understood that the present invention is by no means limited to the particularities of the examples.

In Preparations 1 through 5, polymer-type polymerization initiators are prepared by the solution polymerization method.

Preparation 1

0.31 g (0.0028 mole) of N-vinyl-2-pyrrolidone (abbreviated to NVP), 1.00 g (0.0028 mole) of t-butylperoxy lauryl fumarate (abbreviated to LF—PO), 0.002 g ($8.05 \times 10^{-6}$ mole) of 2, 2'-azobis(2, 4-dimethylvaleronitrile) (abbreviated to V—65), and 2 cc of tetrahydrofuran (abbreviated to THF) are put in a 50 ml glass ampule. The gas in the ampule is displaced by nitrogen gas, and the ampule is sealed. At 40° C., the copolymerization reaction is effected for 18 hours. After the completion of the copolymerization, the solution containing the copolymer produced is diluted by 30 cc of diethyl ether. The diluted solution is transferred to a separating funnel, and washed three times with distilled water. Subsequently, the layer of the diethyl ether is separated, dried on anhydrous magnesium sulfate, and filtered. Next, the filtered solution is subjected to reduced pressure so as to evaporate and remove the diethyl ether. Thus, 1.23 g of extremely viscous residue, namely, copolymer is obtained. The yield is 93.9%. The Fourier-transform infra-red absorption spectrum (IR) of the copolymer is shown in the graph of FIG. 1.

The IR spectrum of FIG. 1 indicates disappearance of the characteristic absorption peak at 1629 cm$^{-1}$ due to the vinyl group of NVP and the characteristic absorption peak at 1643 cm$^{-1}$ due to the vinyl group of LF—PO. This means that the copolymerization has taken place. The Fourier-transform IR spectrum of FIG. 1 has the characteristic absorption peaks at the bands of υ (wave-length) =1690 to 1700 cm$^{-1}$, 1725 to 1735 cm$^{-1}$, and 1770 to 1780 cm$^{-1}$ due to the group,

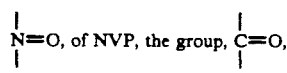

of the lauryl ester of LF—PO, and the group,

of the t-butylperoxy ester of LF—PO, respectively. Thus, it is identified that the copolymer produced is the polymer-type polymerization initiator as desired.

Preparation 2

0.73 g (0.0066 mole) of NVP, 0.85 g (0.0039 mole) of t-butylperoxy ethyl fumarate (abbreviated to EF—PO), 1.43 g (0.0026 mole) of bis(octafluoropentyl) fumarate (abbreviated to DF$_8$F), 0.033 g ($1.33 \times 10^{-4}$ mole) of V—65, and 1.82 g of THF are put in a 50 ml glass ampule. The gas in the ampule is displaced by nitrogen gas, and the ampule is sealed. At 40° C., the copolymerization reaction is effected for 18 hours. After the completion of the copolymerization, the polymerization product, namely, solution containing the copolymer produced is poured in a mass of n-hexane so as to precipitate the copolymer. The precipitated copolymer is separated by filtration, and dried. Thus, 2.64 g of polymer-type polymerization initiator is obtained. The yield is 87.7%. The Fourier-transform infra-red absorption spectrum (IR) of the copolymer is shown in FIG. 2.

Figure 2:
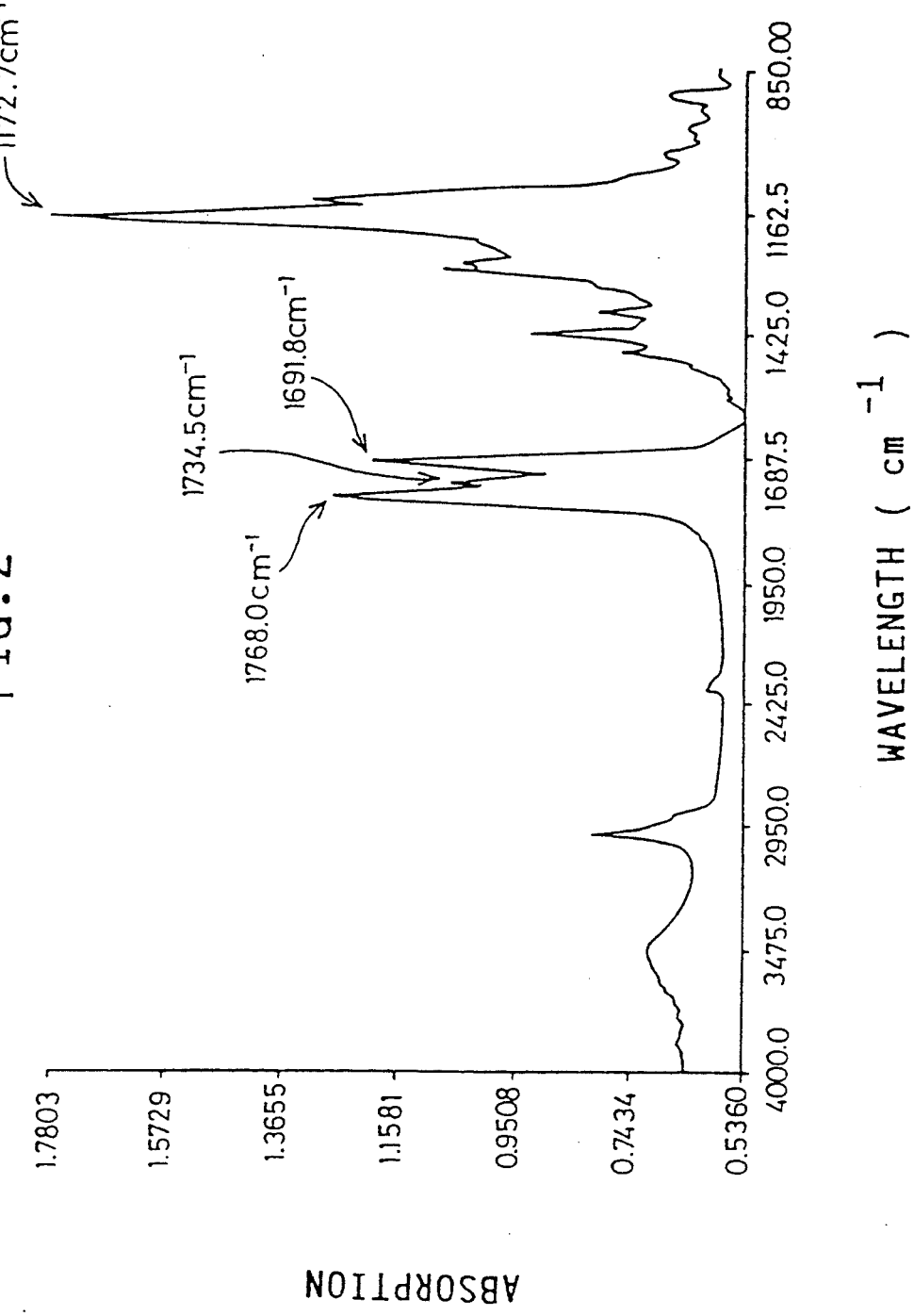
FIG. 2 is a graph showing a Fourier-transform infrared absorption spectrum (IR) of the polymer-type polymerization initiator of Preparation 2, which is used in the present invention.

The IR spectrum of FIG. 2 has the characteristic absorption peaks at the bands of υ=1690 to 1700 cm$^{-1}$, 1730 to 1740 cm$^{-1}$, 1765 to 1780 cm$^{-1}$, and 1140 to 1200 cm$^{-1}$ due to the group,

of NVP the group,

of the ethyl ester of EF—PO, the group,

of the t-butylperoxy ester of EF—PO and octafluoropentyl ester of DF$_8$F, and the —CF$_2$—of the octafluoropentyl group, respectively. Thus, it is identified that the copolymer obtained is the polymer-type polymerization initiator as desired.

Preparations 3, 4, And 5

Like the composition of Preparation 2, each of the compositions of Preparations 3 through 5, indicated in Table I, is copolymerized. The copolymer produced is treated and purified so as to obtain the polymer-type polymerization initiator. The IR spectrum of each polymerization initiator obtained indicates that the monomers used have been introduced into the molecule thereof.

TABLE I

| | COMPOSITION FOR COPOLYMERIZATION | | | | | | |
|---|---|---|---|---|---|---|---|
| | NVP | St | EF-PO | Me-S$_2$F | V-65 | IPP | THF |
| PREPARATION 3 | 0.86 g | — | 0.67 g | 1.47 g | 0.038 g | — | 1.82 g |

TABLE I-continued

| | COMPOSITION FOR COPOLYMERIZATION | | | | | | |
|---|---|---|---|---|---|---|---|
| | NVP | St | EF-PO | Me-S$_2$F | V-65 | IPP | THF |
| PREPARATION 4 | (50 mole %) — | 0.98 g (50 mole %) | (20 mole %) 2.02 g (50 mole %) | (30 mole %) — | — | 0.039 g | 2.84 g |
| PREPARATION 5 | — | 3.95 g (80 mole %) | 2.05 g (20 mole %) | — | — | 0.098 g | 5.37 g |

NVP; N-vinyl-2-pyrrolidone
St; styrene
EF-PO; t-butylperoxy ethyl fumarate
Me-S$_2$F; methyl pentamethyldisiloxanyl-propyl fumarate
V-65; 2,2'-azobis(2,4-dimethylvaleronitrile)
IPP; diisopropylperoxy dicarbonate
THF; tetrahydrofuran

Invention Examples 1, 2, 3 And 4
Production of Graft Copolymer By Using Polymer-Type Polymerization Initiator And Evaluation Of The Graft Copolymer The polymer-type polymerization initiator of Preparation 1 (abbreviated to NF—PO<L>), the polymer-type polymerization initiator of Preparation 2 (abbreviated to NF$_8$F—PO<E>523), the polymer-type polymerization initiator of Preparation 3 (abbreviated to NS$_2$F—PO<E>532), and the polymer-type polymerization initiator of Preparation 5 (abbreviated to SF—PO<E>82), are used for graft copolymerization of 2-hydroxyethyl methacrylate (abbreviated to 2-HEMA).

Table II shows the compositions for Invention Examples 1, 2, 3, and 4. Each of the compositions is put in a 50 ml glass ampule. The gas in the ampule is displaced by nitrogen gas, and the ampule is sealed. The copolymerization reaction is effected at 80° C. for 18 hours and subsequently at 115° C. for 2 hours. After the completion of the copolymerization, the solution containing the copolymer produced is diluted with methanol, and poured into a mass of diethyl ether so as to precipitate the copolymer. The precipitated copolymer is separated by filtration, and dried. Thus, the crude graft copolymer is obtained.

Figure 3:
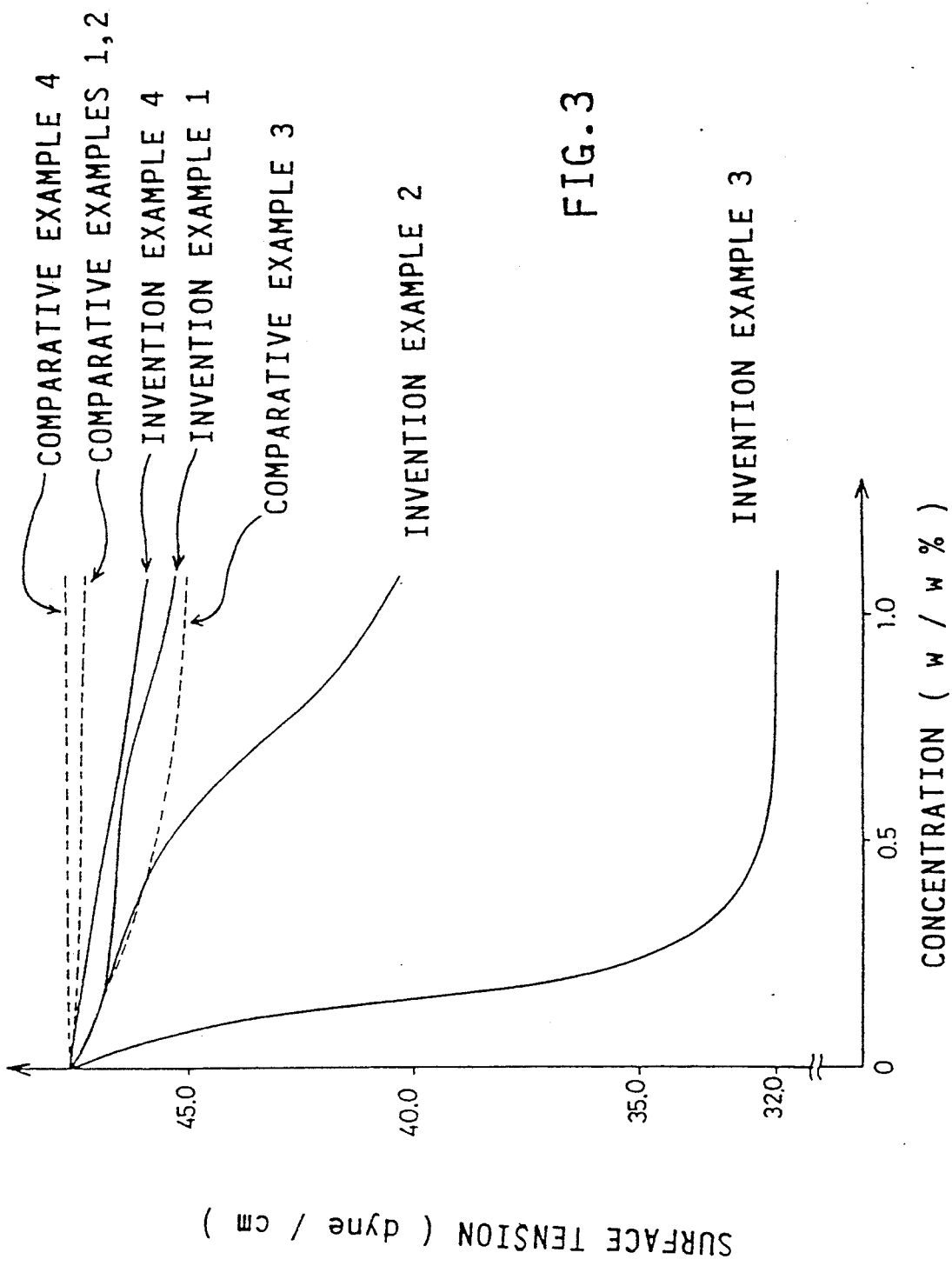
FIG. 3 is a graph indicating surface tension values of the solutions at different concentrations of each of the graft polymers of Invention Examples 1 through 4 and the random polymers of Comparative Examples 1 through 4.

Each of the graft copolymers is dissolved in ethylene glycol so as to obtain its solutions at different concentrations of 0.05, 0.1, 0.5, and 1.0 w/w %. The surface tension of each of the solutions is measured. The test results are shown in the graph of FIG. 3.

Comparative Examples 1, 2, 3 And 4
Production Of Random Copolymer Of 2-HEMA And Hydrophobic Monomer And Evaluation Of The Random Copolymer The polymer-type polymerization initiators used for Invention Examples 1 through 4 contain a hydrophobic group in the molecule; lauryl group for NF—PO<L>, octafluoropentyl group for NF$_8$F—PO<E>523, pentamethyl-disiloxanyl group for NS$_2$F—PO<E>532, and phenyl group for SF—PO<E>82. First, 2-HEMA is used for random copolymerization with each of four hydrophobic monomers which contain the lauryl group, octafluoropentyl group, pentamethyldisiloxanyl group, and phenyl group, respectively, in such a manner that the amount in mole of the hydrophobic groups randomly distributed in the molecule of each of the four 2-HEMA random copolymers produced is equal to that of the hydrophobic groups contained in the corresponding 2-HEMA graft copolymer which is produced by using the corresponding polymer-type polymerization initiator and which contains grafted poly 2-HEMA in the molecule. The thus obtained 2-HEMA random copolymers are used as Comparative Examples 1, 2, 3, and 4, respectively.

Each of the compositions for Comparative Examples 1, 2, 3, and 4, indicated in Table III, is put in a 50 ml glass ampule. The gas in the ampule is displaced by nitrogen gas, and the ampule is sealed. At 40° C., the copolymerization reaction is effected for 24 hours. After the completion of the copolymerization, the solution containing the copolymer produced is diluted with methanol, and then poured in a mass of diethyl ether so as to precipitate the copolymer. The precipitated co-

TABLE II

| | INVENTION EXAMPLE 1 | INVENTION EXAMPLE 2 | INVENTION EXAMPLE 3 | INVENTION EXAMPLE 4 |
|---|---|---|---|---|
| MONOMER | 2-HEMA 2.0 g | 2-HEMA 2.0 g | 2-HEMA 2.0 g | 2-HEMA 2.0 g |
| POLYMELIZATION INITIATOR | NF-PO<L> 0.07 g | NF$_8$F-PO <E>523 0.12 g | NS$_2$F-PO <E>532 0.15 g | SF-PO <E>82 0.07 g |
| CHAIN TRANSFER AGENT | DSH 0.02 g | DSH 0.02 g | DSH 0.02 g | DSH 0.02 g |
| PEROXIDE DECOMPOSITION ACCELERATOR | DMA 0.02 g | DMA 0.02 g | DMA 0.02 g | DMA 0.02 g |
| POLYMELIZATION SOLVENT | MCS 6.0 g | MCS 6.0 g | MCS 6.0 g | MCS 6.0 g |

2-HEMA; 2-hydroxyethyl methacrylate
DSH; dodecylmercaptan
DMA; N,N-dimethyl aniline
MCS; ethylene glycol monomethyl ether polymer is separated by filtration, and dried. Thus, the random copolymer for each of Comparative Examples 1 through 4 is obtained.

Each of the random copolymers is dissolved in ethylene glycol so as to obtain its solutions at different concentrations of 0.05, 0.1, 0.5, and 1.0 w/w %. The surface tension of each of the solutions is measured, like Invention Examples 1 through 4. The test results are shown in the graph of FIG. 3, together with the results of Invention Examples 1 through 4.

As is apparent from the graph of FIG. 3, the 2-HEMA graft copolymers of Invention Examples 1 through 4 which contain in the molecule the grafted poly 2-HEMA have more excellent surface tension-lowering property than the corresponding 2-HEMA random copolymers of Comparative Examples 1 through 4, although the latter contain in the molecule the same amount in mole of hydrophobic groups as the former.

TABLE IV-continued

|  | INVENTION EXAMPLE 5 | INVENTION EXAMPLE 6 | INVENTION EXAMPLE 7 |
|---|---|---|---|
| PEROXIDE DECOMPOSITION ACCELERATOR | DMA 0.03 g | DMA 0.03 g | DMA 0.03 g |
| POLYMELIZATION SOLVENT | MCS 6.0 g | MCS 6.0 g | MCS 6.0 g |

Invention Examples 8 Through 21

Contact lens treatment solutions for Invention Examples 8 through 21 are prepared by dissolving the graft copolymers of Invention Examples 1 through 7 in two sorts of solvents, in the manners indicated in Table V. subsequently the holder holding the contact lens is im-

TABLE III

|  | COMPARATIVE EXAMPLE 1 | COMPARATIVE EXAMPLE 2 | COMPARATIVE EXAMPLE 3 | COMPARATIVE EXAMPLE 4 |
|---|---|---|---|---|
| MONOMERS | 2-HEMA | 2-HEMA | 2-HEMA | 2-HEMA |
|  | 1.961 g | 1.942 g | 1.944 g | 1.969 g |
|  | LMA | 8FPA | S$_2$MA | St |
|  | 0.039 g | 0.058 g | 0.056 g | 0.031 g |
| POLYMELIZATION INITIATOR | V-65 0.038 g | V-65 0.038 g | V-65 0.038 g | V-65 0.039 g |
| CHAIN TRANSFER AGENT | DSH 0.015 g | DSH 0.015 g | DSH 0.015 g | DSH 0.015 g |
| POLYMELIZATION SOLVENT | MCS 6.0 g | MCS 6.0 g | MCS 6.0 g | MCS 6.0 g |

LMA; lauryl methacrylate
8FPA; octafluoropentyl methacrylate
S$_2$MA; pentamethyldisiloxanyl-propyl methacrylate
St; styrene
V-65; 2,2'-azobis(2,4-dimethylvaleronitrile)

Invention Examples 5, 6, And 7

The polymer-type polymerization initiator of Preparation 4 (abbreviated to SF—PO<E>55), together with SF—PO<E>82 and NR$_8$F—PO<E>523, are used for graft copolymerization of 2-HEMA or a mixture of monomers which contains 2-HEMA as a major constituent thereof.

Each of the compositions for Invention Examples 5, 6 and 7, indicated in Table IV, is polymerized like Invention Examples 1 through 4, so that the curde graft copolymers of Invention Examples 5 through 7 are obtained.

TABLE IV

|  | INVENTION EXAMPLE 5 | INVENTION EXAMPLE 6 | INVENTION EXAMPLE 7 |
|---|---|---|---|
| MONOMER OR MIXTURE OF MONOMERS | 2-HEMA 2.0 g | 2-HEMA 1.8 g 8FPA 0.2 g | 2-HEMA 1.8 g 8FPA 0.2 g |
| POLYMELIZATION INITIATOR | SF-PO <E>55 0.05 g | SF-PO <E>82 0.07 g | NF$_8$F-PO <E>523 0.11 g |
| CHAIN TRANSFER AGENT | DSH 0.02 g | DSH 0.02 g | DSH 0.02 g | mersed for five seconds in a keep case therefor filled with each solution. After the holder with the contact lens is removed out of the case, the contact lens is rinsed with water, a poor solvent. Thus, the hydrophobic surface of the contact lens is modified into a hydrophilic surface.

Thereafter, water drops are scattered from the hydrophilic surface of the contact lens by using an air compressor, and the angle of contact with respect to the hydrophilic lens surface is measured by the droplet method using "Goniometer-Type Contact Angle Meter, G-1" available from Eruma Kagaku Kabushiki Kaisha, Japan. The measurement results are also indicated in Table V.

Comparative Examples 5, 6, And 7

By using, as Comparative Examples 5 and 6, an aqueous solution of polyvinyl alcohol and an aqueous solution of poly N-vinylpyrrolidone which are conventional common solutions having the capability of modifying a hydrophobic lens surface into a hydrophilic surface, a contact lens is treated, like Invention Examples 8 through 21. Subsequently, angle of contact is measured. The results are indicated in Table VI. In addition, angle of contact is measured on a contact lens, as Comparative Example 7, which has not been subjected to any solution treatment.

TABLE V

| INVENTION EXAMPLES No. | GRAFT COPOLYMER (sort/amount) | SOLVENT EG | SOLVENT PEG 400 | SOLVENT DISTILLED WATER | ANGLE OF CONTACT |
|---|---|---|---|---|---|
| 8  | IN. EX.* 1 0.05 g | 9.95 g | — | — | 42.8° |
| 9  | IN. EX. 2 0.05 g  | 9.95 g | — | — | 41.3° |
| 10 | IN. EX. 3 0.05 g  | 9.95 g | — | — | 44.8° |
| 11 | IN. EX. 4 0.05 g  | 9.95 g | — | — | 41.7° |
| 12 | IN. EX. 5 0.05 g  | 9.95 g | — | — | 40.8° |
| 13 | IN. EX. 6 0.05 g  | 9.95 g | — | — | 54.8° |
| 14 | IN. EX. 7 0.05 g  | 9.95 g | — | — | 55.8° |
| 15 | IN. EX. 1 0.04 g  | — | 3.98 g | 3.98 g | 43.6° |
| 16 | IN. EX. 2 0.04 g  | — | 3.98 g | 3.98 g | 42.8° |
| 17 | IN. EX. 3 0.04 g  | — | 3.98 g | 3.98 g | 45.0° |
| 18 | IN. EX. 4 0.04 g  | — | 3.98 g | 3.98 g | 42.3° |
| 19 | IN. EX. 5 0.04 g  | — | 3.98 g | 3.98 g | 40.6° |
| 20 | IN. EX. 6 0.04 g  | — | 3.98 g | 3.98 g | 53.4° |
| 21 | IN. EX. 7 0.04 g  | — | 3.98 g | 3.98 g | 54.7° |

*IN EX. = INVENTION EXAMPLE
EG; ethylene glycol
PEG 400; polyethylene glycol (average molecule weight: 400)

TABLE VI

| COMPARATIVE EXAMPLES No. | POLYMER (sort/amount) | SOLVENT (DISTILLED WATER) | ANGLE OF CONTACT |
|---|---|---|---|
| 5 | PVA 0.1 g  | 9.9 g | 89.9° |
| 6 | PNVP 0.1 g | 9.9 g | 92.3° |
| 7 | —          | —     | 102.1° |

PVA; polyvinyl alcohol (saponification degree: 86.5-89.0%) available from Nippon Gosei Kagaku Kogyo Kabushiki Kaisha, Japan.
PNVP; poly N-vinylpyrrolidone available from Wako Junyaku Kabushiki Kaisha, Japan.

As is apparent from the results indicated in Table V, the treatment of a contact lens with each of the solutions of Invention Examples 8 through 21, even for a very short period of time, results in advantageously lowering the angle of contact of the lens. That is, the treatment solutions in accordance with the present invention have excellent property of modifying a hydrophobic contact lens surface into a hydrophilic surface.

While the present invention has been described with the particularities of the examples thereof, it is to be understood that the present invention may be embodied with various changes, improvements and modifications that may occur to those skilled in the art without departing from the scope and spirit of the invention defined in the appended claims.

What is claimed is:

1. A graft copolymer produced by polymerizing 2-hydroxyethyl methacrylate, or a mixture of ethylenically unsaturated monomers which contains as a major constituent thereof 2-hydroxyethyl methacrylate and contains not more than 20 weight % of at least one ethylenically unsaturated monomer other than 2-hydroxyethyl methacrylate, by using a polymeric polymerization initiator having a number average molecular weight of from about 1,000 to about 1,000,000 produced by copolymerizing (A) 40 to 60 mole % of an N-vinyllactam and (B) 60 to 40 mole % of at least one peroxyfumarate, said peroxy fumarate (B) being represented by the following formula:

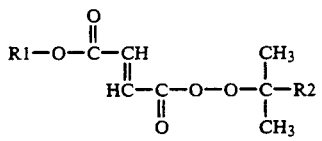

wherein R1 is a linear alkyl, branched alkyl or cycloalkyl group containing not more than 18 carbon atoms, or an aromatic hydrocarbon group containing 6 to 18 carbon atoms; and R2 is a linear alkyl, branched alkyl or cycloalkyl group containing not more than 13 carbon atoms, or a phenyl group.

2. The graft copolymer as set forth in claim 1, wherein said N-vinyllactam is selected from the group consisting of N-vinyl-2-pyrrolidone, N-vinyl-3-methyl-2-pyrrolidone, N-vinyl-5-methyl-2-pyrrolidone, N-vinyl-3, 3, 5-trimethyl-2-pyrrolidone, N-vinyl-5-phenyl-2-pyrrolidone, N-vinyl-3-benzyl-2-pyrrolidone, N-vinyl-piperidone, N-vinylcaprolactam, and N-vinylcapryllactam.

3. The graft copolymer as set forth in claim 1, wherein said N-vinyllactam is N-vinyl-2-pyrrolidone.

* * * * *